(12) United States Patent
Lee et al.

(10) Patent No.: US 10,677,613 B2
(45) Date of Patent: *Jun. 9, 2020

(54) RESOLVER

(71) Applicant: LS AUTOMOTIVE TECHNOLOGIES CO., LTD., Gyeonggi-Do (KR)

(72) Inventors: Won-Yong Lee, Seoul (KR); Byung-Cheol Na, Gyeonggi-Do (KR); Da-Hee Sim, Gyeonggi-do (KR); Seong-Wook Lee, Gyeonggi-do (KR); Yeon-Muk Choi, Gyeonggi-do (KR)

(73) Assignee: LS AUTOMOTIVE TECHNOLOGIES CO., LTD., Gyeonggi-do (KR)

( * ) Notice: Subject to any disclaimer, the term of this patent is extended or adjusted under 35 U.S.C. 154(b) by 32 days.

This patent is subject to a terminal disclaimer.

(21) Appl. No.: 15/770,378

(22) PCT Filed: Dec. 29, 2015

(86) PCT No.: PCT/KR2015/014434
§ 371 (c)(1),
(2) Date: Apr. 23, 2018

(87) PCT Pub. No.: WO2017/082462
PCT Pub. Date: May 18, 2017

(65) Prior Publication Data
US 2018/0313667 A1  Nov. 1, 2018

(30) Foreign Application Priority Data

Nov. 13, 2015 (KR) .................. 10-2015-0159823

(51) Int. Cl.
*G01D 5/20* (2006.01)
*G01D 5/245* (2006.01)
(Continued)

(52) U.S. Cl.
CPC .............. *G01D 5/2046* (2013.01); *G01B 7/30* (2013.01); *G01D 5/20* (2013.01); *G01D 5/245* (2013.01); *H02K 24/00* (2013.01)

(58) Field of Classification Search
CPC ........... H02K 1/14; H02K 1/146; H02K 1/24; H02K 3/18; H02K 3/28; H02K 3/32;
(Continued)

(56) References Cited

U.S. PATENT DOCUMENTS

2005/0040816 A1    2/2005 Ando et al.
2006/0119352 A1*   6/2006 Nishimura ............... G01D 5/12
                                                          324/207.25
(Continued)

FOREIGN PATENT DOCUMENTS

JP    1996-178610 A    7/1996
JP    2005-61865 A     3/2005
(Continued)

OTHER PUBLICATIONS

International Search Report dated Aug. 8, 2016, issued in International Application No. PCT/KR2015/014434, with English Translation.

*Primary Examiner* — Tran N Nguyen
(74) *Attorney, Agent, or Firm* — Harness, Dickey & Pierce, P.L.C.

(57) ABSTRACT

Disclosed is a resolver, which includes a stator made of a magnetic material and having a plurality of teeth and a plurality of slots alternately formed at an inner side thereof; insulation covers respectively having a tooth insulating unit formed at an inner side thereof corresponding to the teeth and mounted to the stator at both upper and lower surfaces of the stator; and coils wound on the teeth with the tooth insulating unit being interposed therebetween, wherein a coil occupying ratio per slot, which is defined by the following equation and represents a ratio of area occupied (Continued)

by the coils in a slot to which the insulation covers are fixed, is 35% or below:

Coil occupying ratio per slot=(area occupied by coils in a single slot)/(area of a single slot)  Equation.

7 Claims, 12 Drawing Sheets

(51) Int. Cl.
*G01B 7/30* (2006.01)
*H02K 24/00* (2006.01)

(58) Field of Classification Search
CPC .. H02K 3/34; H02K 3/46; H02K 3/50; H02K 3/52; H02K 3/522; H02K 24/00; H02K 29/12; G01D 5/14; G01D 5/145; G01D 5/20; G01D 5/204; G01D 5/2046; G01D 5/208; G01D 5/2086; G01D 5/22; G01D 5/221; G01D 5/2216; G01D 5/24; G01D 5/244; G01D 5/24433; G01D 5/245; G01B 7/30; G01P 3/488; H02P 6/16; F15B 15/2815
See application file for complete search history.

(56) References Cited

U.S. PATENT DOCUMENTS

| | | | |
|---|---|---|---|
| 2008/0309278 A1* | 12/2008 | Chang | G01D 5/2073 318/605 |
| 2011/0285386 A1 | 11/2011 | Kikuchi et al. | |
| 2014/0002064 A1 | 1/2014 | Kawamura et al. | |
| 2014/0125324 A1 | 5/2014 | Jin et al. | |
| 2015/0028862 A1* | 1/2015 | Otobe | G01D 5/2046 324/207.18 |

FOREIGN PATENT DOCUMENTS

| | | |
|---|---|---|
| JP | 2008-40835 A | 2/2008 |
| JP | 2009-2665 A | 1/2009 |
| JP | 2009-128133 A | 6/2009 |
| JP | 2010-43908 A | 2/2010 |
| JP | 2010-259267 A | 11/2010 |
| JP | 2011-102701 A | 5/2011 |
| JP | 2011-188611 A | 9/2011 |
| JP | 2011-247772 A | 12/2011 |
| JP | 2013-110819 A | 6/2013 |
| JP | 2013-156144 A | 8/2013 |
| JP | 2013-217852 A | 10/2013 |
| JP | 2014-10051 A | 1/2014 |
| JP | 2015-27221 A | 2/2015 |
| JP | 2015-186370 A | 10/2015 |
| KR | 10-2011-0009154 A | 1/2011 |
| KR | 10-1297273 B1 | 8/2013 |
| KR | 10-2014-0057078 A | 5/2014 |

* cited by examiner

RESOLVER

CROSS-REFERENCE TO RELATED APPLICATIONS

This application is a national phase application of PCT Application No. PCT/KR2015/014434, filed on Dec. 29, 2015, which claims the benefit and priority to Korean Patent Application No. 10-2015-0159823, filed Nov. 13, 2015. The entire disclosures of the applications identified in this paragraph are incorporated herein by references.

FIELD

The present disclosure relates to a device for detecting a rotation angle of a rotating device, and more particularly, to a resolver.

BACKGROUND

When controlling a rotating device, for example a motor, rotation information should be detected precisely and rapidly. When controlling a rotating device, a movement or rotating location of a rotating body should be measured accurately by means of a rotation angle detecting device installed at a rotary shaft. A resolver and an encoder have been adopted and used for such measurement, and these detecting devices have advantages and disadvantages. The resolver directly detects an absolute location of a rotor and calculates a rotating direction and a rotating speed by means of the change of location of the rotor.

An electric power steering (EPS) is used for a vehicle in order to assist the operation of a handle by driving a motor with a battery. The electric power steering receives attention as an efficient system with a less power loss of an engine, in comparison to a case where a hydraulic pressure is generated by means of a rotating force of an engine. Since the EPS needs precise control, a rotation angle detecting device for precisely detecting a rotation angle of the motor is required, and the rotation angle detecting device demands high reliability. As such a rotation angle detecting device for a vehicle, a resolver having higher environment resistance in comparison to an encoder is used.

The resolver is a kind of sensor for precisely measuring a rotating speed and a rotation angle of a motor. Generally, the resolver has a relatively simple structure in which both an excitation coil and an output coil are located at a stator and an oval or multi-pole rotor is located at an inner side of the stator. A resolver having this structure is disclosed in Japanese Unexamined Patent Publication No. 1996-178610.

Figure 1:
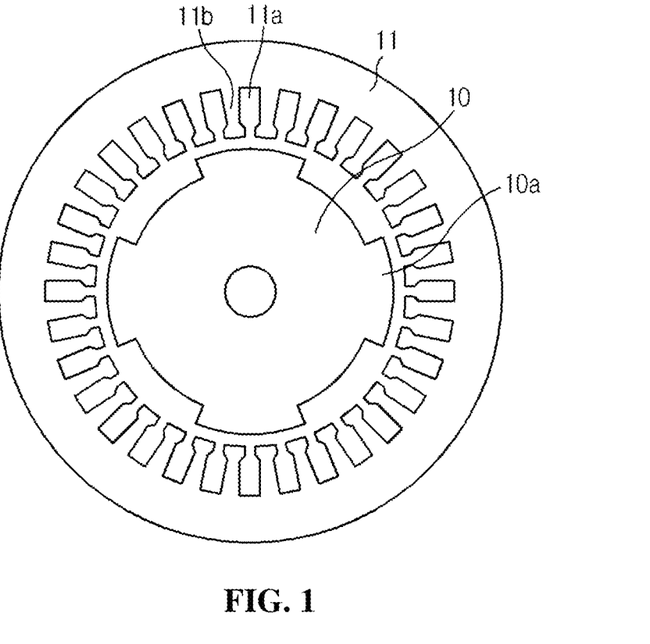
FIG. 1 is a diagram showing a resolver in the related art.

FIG. 1 is a diagram in the above Japanese Unexamined Patent Publication, and a resolver includes a rotor 10 having a rotary shaft provided therethrough and a ring-shaped stator 11 configured to face the rotor 10 with a gap. The rotor 10 has a plurality of salient poles 10a formed along an outer circumference thereof, and the ring-shaped stator 11 has a plurality of teeth 11b and a plurality of slots 11a alternately formed along an inner circumference thereof. In addition, an excitation coil and an output coil are wound on the teeth 11b of the stator 11, and the excitation coil and the output coil are accommodated in the slots 11a. Here, the output coil is composed of a first output coil and a second output coil. If an excitation power is applied to the excitation coil and the rotary shaft is rotated, a sine signal and a cosine signal are output from the first output coil and the second output coil, and a rotation angle of the resolver may be known by analyzing the signals.

As described above, in the resolver, the coils wound on the teeth 11b of the stator 11 is an important element for inputting and outputting signals, and thus a precise design is demanded when winding the coils at a rotation angle detecting device such as a resolver. For example, if a coil is wound more on the teeth 11b, an area occupied by the coil at the slot 11a between the teeth 11b increases, which causes electric interference between coils wound on two adjacent teeth 11b and results in an error. If a coil is wound less on the teeth 11b, a transformation ratio of an induced voltage of the output coil is lowered, which becomes vulnerable to external noise.

RELATED LITERATURES

Patent Literature (Patent Literature 1) Japanese Unexamined Patent Publication No. 1996-178610

DISCLOSURE

Technical Problem

The present disclosure is designed according such a technical demand, and therefore the present disclosure is directed to providing a resolver which is robust against external noise and has a reduced error in the detection of a rotation angle.

Technical Solution

In one aspect of the present disclosure, there is provided a resolver, comprising: a stator made of a magnetic material and having a plurality of teeth and a plurality of slots alternately formed at an inner side thereof; insulation covers respectively having a tooth insulating unit formed at an inner side thereof corresponding to the teeth and mounted to the stator at both upper and lower surfaces of the stator; and coils wound on the teeth with the tooth insulating unit being interposed therebetween, wherein a coil occupying ratio per slot, which is defined by the following equation and represents a ratio of area occupied by the coils in a slot to which the insulation covers are fixed, is 35% or below:

$$\text{Coil occupying ratio per slot} = (\text{area occupied by coils in a single slot})/(\text{area of a single slot}). \quad \text{Equation}$$

The coil occupying ratio per slot may be 3% or above.

In a slot to which the insulation cover is fixed, a shortest distance between coils wound on adjacent two teeth may be 4 mm or above.

The coils may include an excitation coil of one phase or more and an output coil of one phase or more.

The excitation coil and the output coil may have different diameters from each other.

The resolver may further include a rotor made of a magnetic material and configured to rotate based on a rotary shaft to change a gap permeance together with the stator.

The rotor may be an inner-type rotor disposed at an inner center of the stator.

The rotor and the stator may be formed by laminating a plurality of magnetic steel plates with a predetermined thickness.

The stator may be prepared by manufacturing the magnetic steel plates into a ring shape having a plurality of teeth and a plurality of slots alternately formed at an inner side thereof and then laminating the magnetic steel plates.

The rotor may be ring-shaped having a through hole formed at a center portion thereof so that the rotary shaft is inserted therein and a plurality of salient poles formed at an outer circumference thereof to change the gap permeance.

The salient pole may have an arc shape with a diameter smaller than at least a diameter of the rotor.

A center of the arc may be disposed spaced apart from a center of the rotor by a predetermined distance, and the arcs of the plurality of salient poles may have the same diameter.

In another aspect of the present disclosure, there is also provided a resolver, comprising: a stator made of a magnetic material and having a plurality of teeth and a plurality of slots alternately formed at an inner side thereof; insulation covers respectively having a tooth insulating unit formed at an inner side thereof corresponding to the teeth and mounted to the stator at both upper and lower surfaces of the stator; and coils wound on the teeth with the tooth insulating unit being interposed therebetween, wherein in a slot to which the insulation covers are fixed, a shortest distance between coils wound on adjacent two teeth is 4 mm or above.

The coils may include an excitation coil of one phase or more and an output coil of one phase or more.

The excitation coil and the output coil may have different diameters from each other.

The resolver may further include a rotor made of a magnetic material and configured to rotate based on a rotary shaft to change a gap permeance together with the stator.

The rotor may be an inner-type rotor disposed at an inner center of the stator.

The rotor and the stator may be steel plate laminates formed by laminating a plurality of magnetic steel plates with a predetermined thickness.

The stator may be prepared by manufacturing the magnetic steel plates into a ring shape having a plurality of teeth and a plurality of slots alternately formed at an inner side thereof and then laminating the magnetic steel plates.

The rotor may be ring-shaped having a through hole formed at a center portion thereof so that the rotary shaft is inserted therein and a plurality of salient poles formed at an outer circumference thereof to change the gap permeance.

The salient pole may have an arc shape with a diameter smaller than at least a diameter of the rotor.

A center of the arc may be disposed spaced apart from a center of the rotor by a predetermined distance, and the arcs of the plurality of salient poles may have the same diameter.

Advantageous Effects

The resolver of the present disclosure may precisely measures a rotation angle of a rotating device such as a motor since the resolver is robust against external noise and has an output waveform of enhanced accuracy.

The resolver of the present disclosure may have improved product performance by reducing interference between magnetic fluxes generated at adjacent teeth.

DETAILED DESCRIPTION

The above objects, features and advantages of the present disclosure will become apparent from the following descriptions of the embodiments with reference to the accompanying drawings, from which it will be deemed that a person having ordinary skill can easily practice the technical features of the present disclosure. Also, any explanation of the prior art known to relate to the present disclosure may be omitted if it is regarded to render the subject matter of the present disclosure vague. Hereinafter, an embodiment of the present disclosure will be described in detail with reference to the accompanying drawings.

Figure 2:
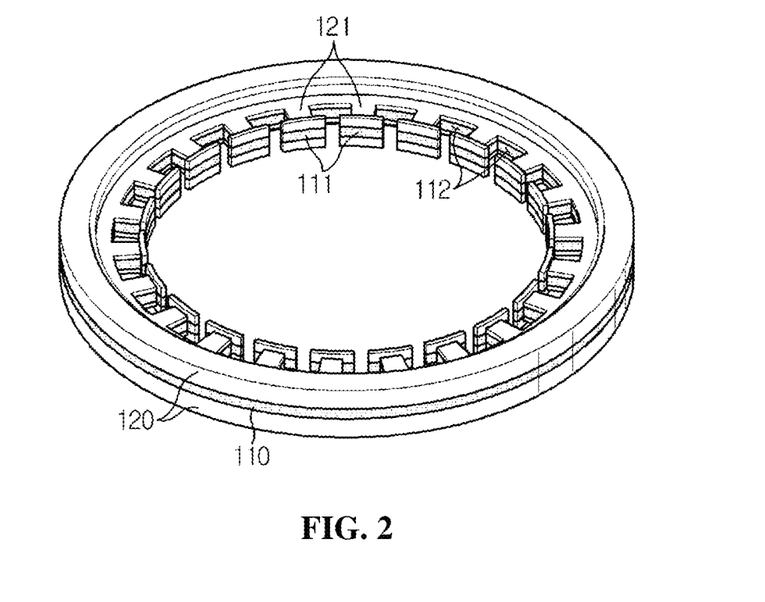
FIG. 2 is a perspective view showing a resolver according to an embodiment of the present disclosure.
Figure 3:
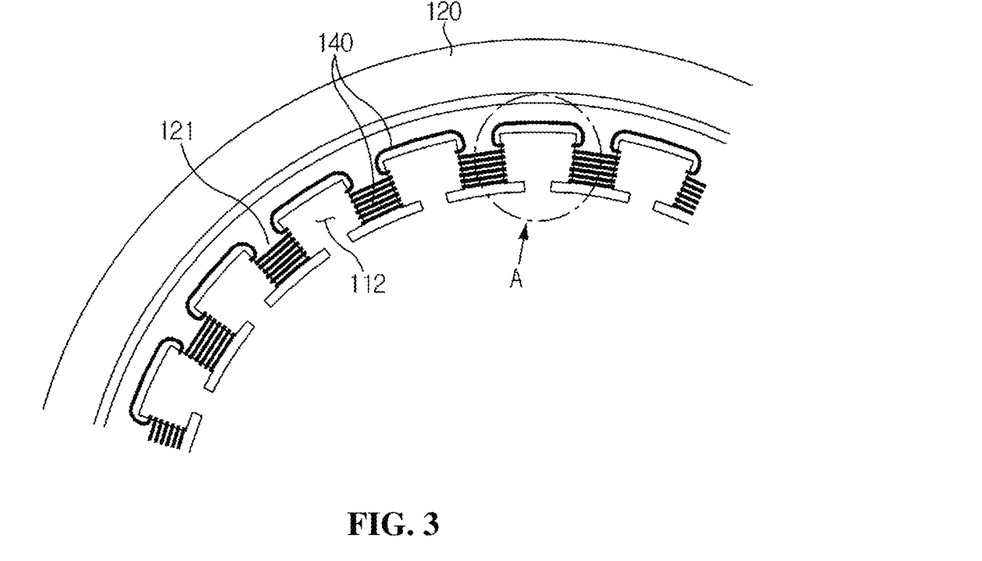
FIG. 3 is a partial plane view showing the resolver of FIG. 2.
Figure 4:
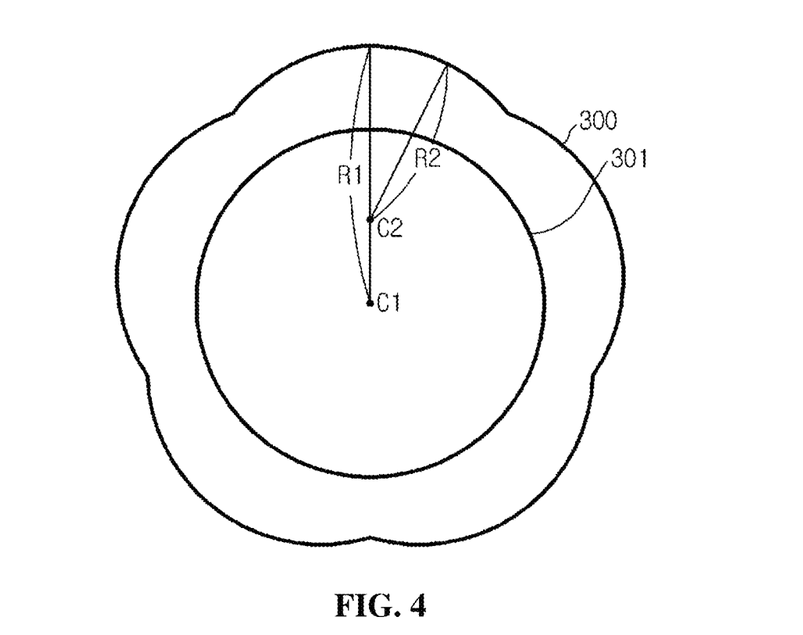
FIG. 4 is a diagram showing a rotor of the resolver according to an embodiment of the present disclosure.

FIG. 2 is a perspective view showing a resolver according to an embodiment of the present disclosure, FIG. 3 is a partial plane view showing the resolver of FIG. 2, and FIG. 4 is a diagram showing a rotor of the resolver according to an embodiment of the present disclosure.

Referring to FIGS. 2 to 4, a resolver of this embodiment includes a rotor 300, a stator 110 made of a magnetic material and having a plurality of teeth 111 and a plurality of slots 112 alternately formed along an inner circumference thereof, ring-shaped insulation covers 120 mounted to both upper and lower surfaces of the stator 110, and coils 140 respectively wound on the teeth 111 with the insulation cover 120 being interposed therebetween.

The rotor 300 is a ring-shaped ferromagnetic body having a through hole 301 formed at center portion thereof so that a rotary shaft is inserted through the through hole 301. The rotor 300 may be formed by laminating magnetic steel plates of a predetermined thickness. The rotor 300 serves as an inner-type ferromagnetic body disposed at an inner center of the stator 110 and has a plurality of salient poles formed along an outer circumference thereof to transform a gap permeance together with the stator 110 while rotating based on the rotary shaft. At this time, the salient pole of the rotor 300 has an arc shape having a diameter R2 smaller than a diameter R1 of the rotor 300. A center C2 of the arc of the salient pole is disposed spaced apart from a center C1 of the rotor 300 by a predetermined distance, and the diameter R2 of the arc of each salient pole may be identical to each other.

The stator 110 serves as a ring-shaped ferromagnetic body having a plurality of teeth 111 formed along an inner circumference thereof to face the rotor 300 with a gap and slots 112 between adjacent teeth 111. The stator 110 may be prepared by manufacturing magnetic steel plates into a ring shape having a plurality of teeth 111 and a plurality of slots 112 alternately formed at an inner side thereof and laminating the magnetic steel plates.

The insulation covers 120 are mounted to both upper and lower surfaces of the stator 110 and are composed of an upper insulation cover and a lower insulation cover. The insulation cover 120 has a plurality of tooth insulating units 121 formed to cover the teeth 111 of the stator 110 at regular intervals along an inner circumference thereof. Since the insulation covers 120 are mounted to both upper and lower surfaces of the stator 110, the tooth insulating units 121 cover the upper and lower surfaces of the teeth 111.

In a state where the insulation covers 120 are mounted and fixed to both upper and lower surfaces of the stator 110, the coils 140 are wound on the tooth insulating units 121. In other words, the coil 140 is wound on the teeth 111 with the tooth insulating unit 121 being interposed therebetween, without directly contacting the teeth 111. Since the coil 140 is wound on the teeth 111 with the tooth insulating unit 121 being interposed therebetween, the coil 140 is accommodated in the slot 112. The coil may be composed of a one-phase excitation coil and two-phase output coils. One output coil of the two-phase output coils outputs a SIN signal, and the other output coil outputs a COS signal. If an excitation voltage is applied to the excitation coil and the rotary shaft is rotated, the first output coil and the second output coil outputs a sine signal and a cosine signal, and a rotation angle of the resolver may be known by analyzing the signals.

In this resolver, when the coil is wound on the teeth 111 with the tooth insulating unit 121 being interposed therebetween and accommodated in the slot 112 in a state where the insulation cover 120 is fixed, a coil occupying ratio per slot, which represents a ratio of area occupied by coils in an area of a single slot 112, gives a serious influence on the performance of the resolver. The coil occupying ratio per slot may be expressed as in Equation 1 below.

Coil occupying ratio per slot=(area occupied by coils in a single slot)/(area of a single slot)   Equation 1

Figure 5:
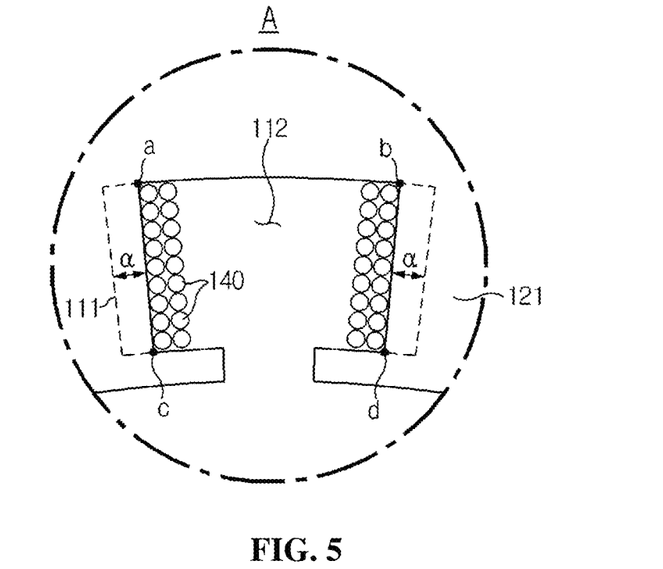
FIG. 5 is an enlarged view showing a portion A of FIG. 3.

The occupying ratio will be described below in more detail with reference to FIGS. 2 to 5. FIG. 5 is an enlarged view showing a portion A of FIG. 3.

As described above with reference to FIGS. 2 and 3, the plurality of teeth 111 and the plurality of slots 112 are alternately formed along the inner circumference of the stator 110. In addition, the insulation covers 120 are mounted and fixed to both upper and lower surfaces of the stator 110. The tooth insulating units 121 corresponding to the teeth 111 of the stator 110 are formed at the inner circumference of the insulation cover 120 to cover each tooth 11 of the stator 110 at both upper and lower surfaces thereof. At this time, when being observed on a plane, the tooth insulating unit 121 covering the teeth 111 is slightly greater than the teeth 111.

In other words, as shown in FIG. 5, the tooth insulating unit 121 may have a width margin ($\alpha$) so that its width is slightly greater than the width of the teeth 111. Therefore, in this embodiment and the appended claims, the area of the slot 112 may be understood as an area from which an area of the width margin is excluded. In other words, in this embodiment, an area of a single slot 112 is not an area between two adjacent teeth 111 but an area between two adjacent tooth insulating units 121. In addition, an area of a single slot 111 is an area of a figure whose vertices correspond to four points (a, b, c, d) of two adjacent tooth insulating units 121 as depicted in FIG. 5.

In the area of the slot 112, an area occupied by the coils 140 may be obtained with the number of turns of the coils 140 and a diameter of each coil 140. For example, if the excitation coil turns by an n number and the output coil turns by a m number at each of two adjacent tooth insulating units 121 (it is assumed that the first output coil and the second output coil have the same radius), an area of the coils 140 accommodated in the slot 112 between the two tooth insulating units 121 may be obtained as in Equation 2 below.

Area of coil=$2n\pi r1^2+4m\pi r2^2$   Equation 2

Here, r1 represents a radius of the excitation coil, and r2 represents a radius of the output coil.

Generally, a minimum number of turns of the output coil required when the excitation coil is wound on the tooth insulating unit 121 may be obtained as in Equation 3 below. In Equation 3, a represents the number of turns of the excitation coil, b represents a transformation ratio, c represents a minimum air gap between the stator and the rotor, d represents a sectional area of each coil, and e represents an input voltage.

Equation 3

$$\text{Minimum number of turns of output coil} = \frac{a}{1-b} \times c \times b \times e \times \frac{1}{d \times 100}$$

Generally, the input voltage input to the excitation coil is at least 4 Vrms and has a frequency of 10 kHz. At this time, the magnetic flux densities of the stator and the rotor serving as ferromagnetic bodies should not be saturated, and thus a maximum magnitude of the input current input to the excitation coil is 0.5 A. If a minimum number of turns of the excitation coil is determined to satisfy this condition, a minimum number of turns of the output coil is determined according to Equation 3. If an occupying ratio is calculated using the determined number of turns of the excitation coil and the output coil, the radii of the excitation coil and the output coil, and the area of the slot 112 between the tooth insulating units 121, it becomes a minimum occupying ratio, and this minimum occupying ratio is 3%. In other words, if the coil occupying ratio in the slot 112 becomes smaller than 3%, the input current input to the excitation coil increases and thus gives damage to a circuit which applies the input voltage, and also the magnetic flux density increases to distort a waveform of the output voltage, namely the induced voltage. In addition, the transformation ratio of the induced voltage generated at the output coil is lowered, thereby being vulnerable to external noise. Therefore, the coil occupying ratio per slot should be at least 3%.

The magnetic flux generated by the input current input to the excitation coil interlinks the output coil to generate an induced voltage. The normal magnetic flux generated by the input current is linked to the rotor. At this time, the magnetic flux generated by the input current is linked to the rotor to generate an eddy current, and the eddy current is generated in a direction opposite to the normal input magnetic flux. In addition, the magnetic flux components generated by the induced voltages generated at the first output coil and the second output coil collide with each other to give an influence to each other. As described above, the eddy current and the magnetic flux component generated by the induced voltage of the output coil distort the induced voltage of the output part to deteriorate the performance of the resolver. In order to minimize such distortion of the induced voltage at the output side, the coil occupying ratio per slot should be 35% or below.

In other words, the distortion of performance of the resolver may be reduced when the coil occupying ratio per slot is in the range of 3% to 35%.

Meanwhile, the magnetic flux may flow smoothly when a certain distance is maintained between the coil wound on a first tooth of two adjacent teeth 111 and a coil wound on a second tooth thereof. If the distance between the coil wound on the first tooth of two adjacent teeth 111 and the coil wound on the second tooth thereof is smaller, the magnetic fluxes respectively generated at the teeth 111 may interfere each other, which may cause distortion of an output waveform and thus generate an error in detecting a rotation angle.

Figure 6:
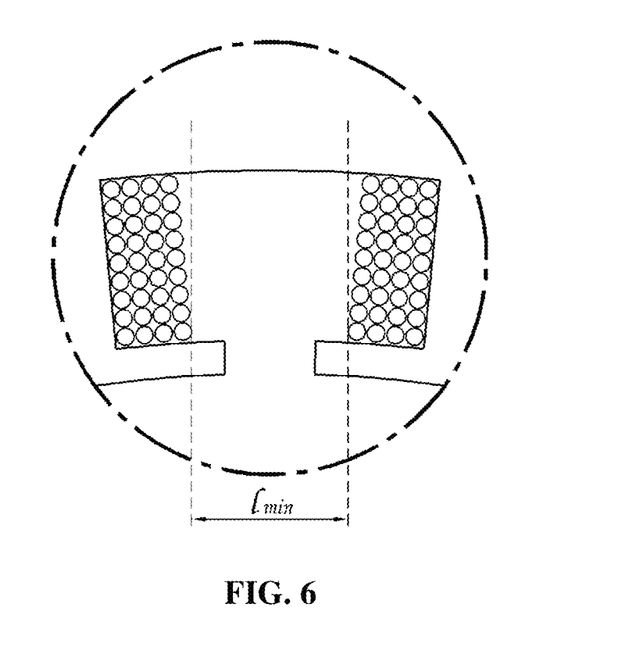
FIG. 6 is a diagram showing a shortest distance between coils according to an embodiment of the present disclosure.

In order to reduce such an error, in the slot 112, a certain distance should be ensured between coils wound on two adjacent teeth 111, and a shortest distance between the coils should be 4 mm or above. FIG. 6 is a diagram showing a shortest distance ($l_{min}$) between the coils according to an embodiment of the present disclosure.

Hereinafter, results of the performance test of a resolver according to the coil occupying ratio per slot and the shortest distance between coils will be described with reference to Table 1 below.

Preparation of Samples

A stator 110 having twenty-four slots 112, insulation covers 120, a rotor 300 having eight salient poles and coils 140 are prepared. At this time, the stator 110 and the rotor 300 are ferromagnetic bodies with high magnetic permeability and are manufactured by laminating steel plates with a thickness of 0.5 mm in order to reduce a core loss. After the stator 110 and the insulation cover 120 are assembled, an excitation coil and an output coil are wound on each slot 112 by means of a circular winding machine to fabricate a resolver. Nine resolvers are prepared in total, and each resolver is fabricated to have an occupying ratio and a shortest distance between coils as in Table 1 below.

Measurement of an Error Rate

Figure 7:
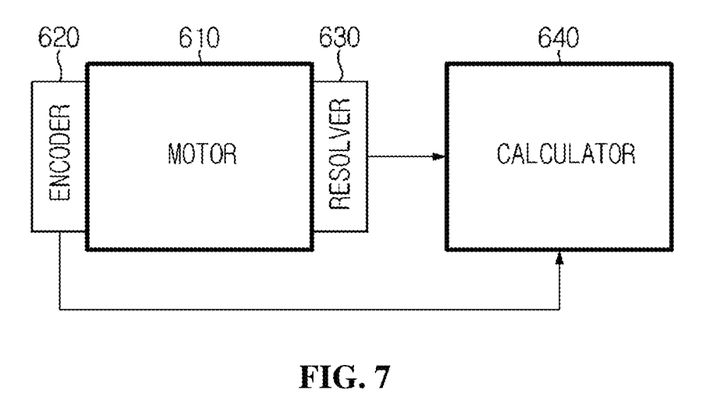
FIG. 7 is a diagram showing a test environment of the resolver according to an embodiment of the present disclosure.

FIG. 7 is a diagram showing a test environment of the resolver according to an embodiment of the present disclosure. After each resolver is prepared as described above in relation to sample preparation, each resolver 630 is coupled to one end of a rotary shaft of a motor 610, and an encoder 620 is coupled to the other end of the rotary shaft. In addition, a calculator 640 analyzes output waveforms of the resolver 630 and the encoder 620. In detail, after the rotary shaft of the motor 610 is operated, the calculator 640 calculates a rotation angle profile by analyzing the output waveform of the resolver 630 and calculates an error rate by comparing the rotation angle profile with a rotation angle profile of the encoder 620. Each resolver 630 is tested ten times, among which a greatest error rate is defined as a maximum error rate. Generally, the resolver is demanded to have a maximum error rate of 0.5 or below.

FIGS. 8 to 16 are graphs showing an error rate of each resolver prepared as a sample, and each graph shows an error rate according to time in a test where a maximum error rate is found, when each resolver 630 is tested ten times. FIGS. 8 to 12 are graphs respectively showing error rates of Examples 1 to 5 of Table 1, and FIGS. 13 to 16 are graphs respectively showing error rates of Comparative Examples 1 to 4 of Table 1.

Figure 8:
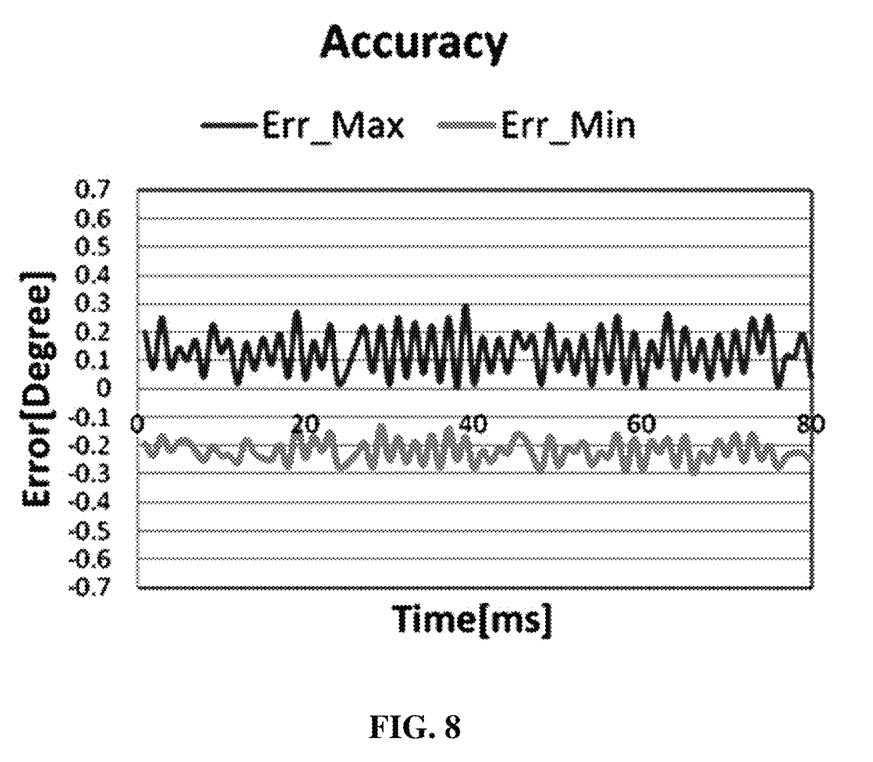
FIGS. 8 to 16 are graphs showing an error rate of each resolver prepared as a sample.
Figure 9:
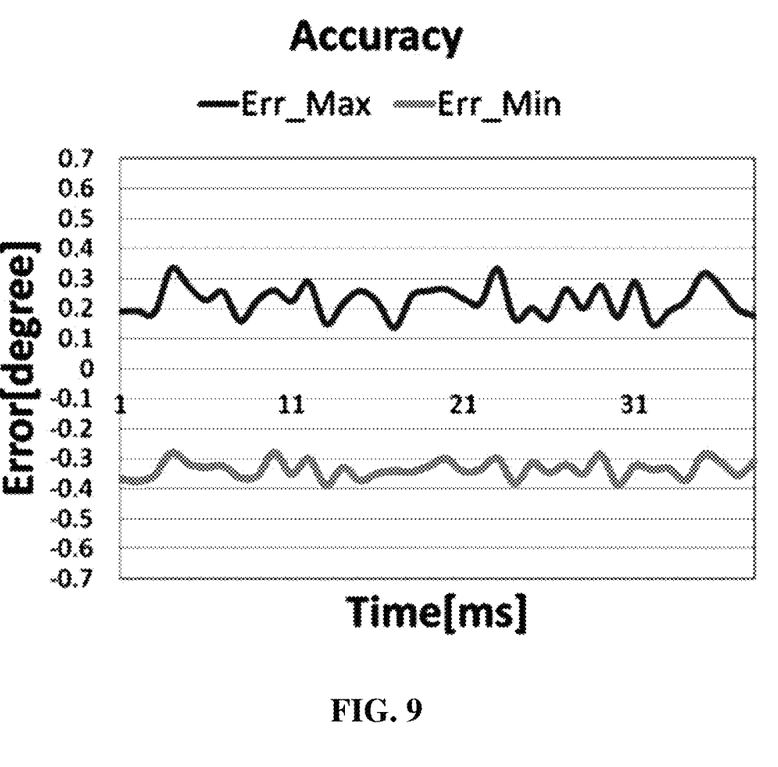
Figure 10:
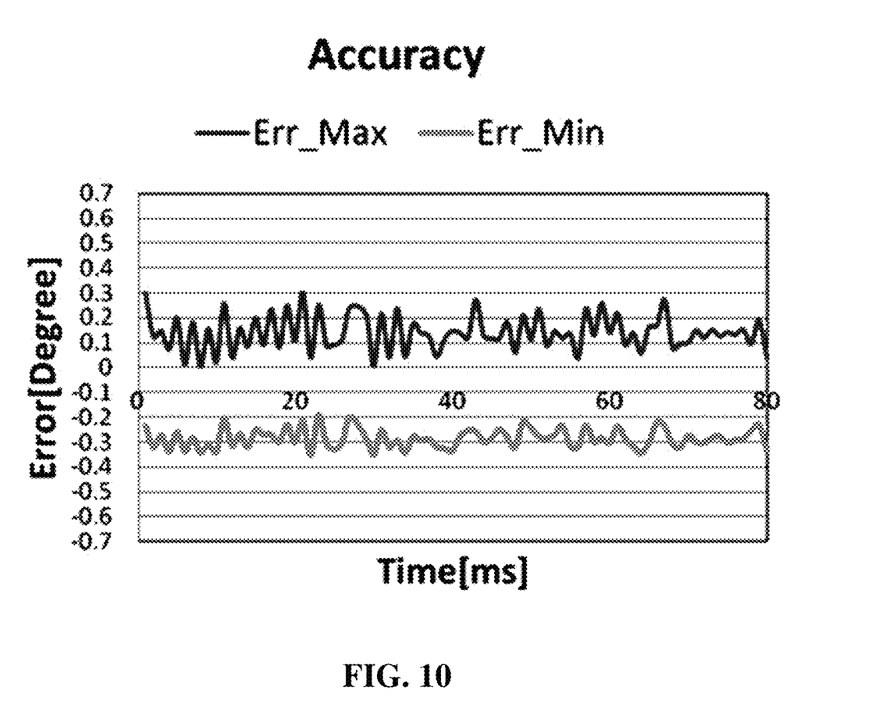
Figure 11:
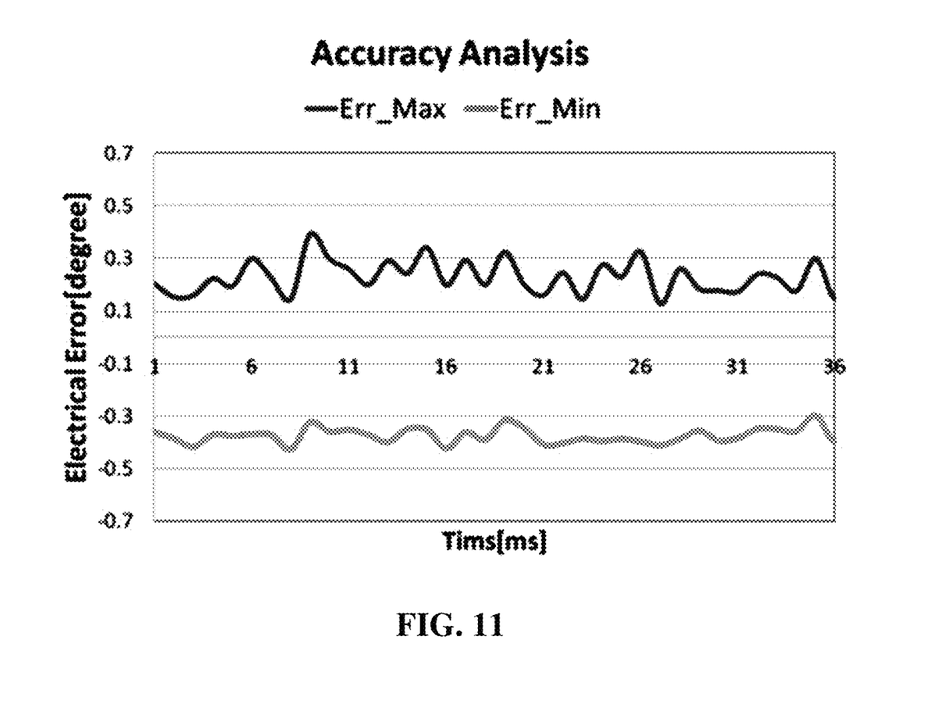
Figure 12:
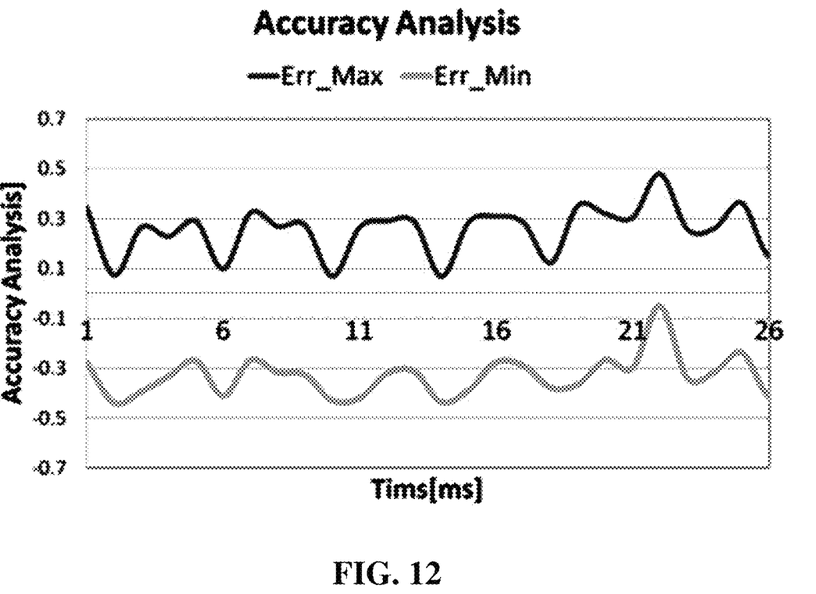

Referring to FIG. 8, the resolver of Example 1 has a plus error rate with a maximum value of 0.3 and a minus error rate with a maximum value of −0.36. Therefore, the maximum error rate is 0.36 which is an absolute value of the minus error rate. Referring to FIG. 9, the resolver of Example 2 has a plus error rate with a maximum value of 0.32 and a minus error rate with a maximum value of −0.33. Therefore, the maximum error rate is 0.33 which is an absolute value of the minus error rate. Referring to FIG. 10, the resolver of Example 3 has a plus error rate with a maximum value of 0.29 and a minus error rate with a maximum value of −0.29. Therefore, the maximum error rate is 0.29. Referring to FIG. 11, the resolver of Example 4 has a plus error rate with a maximum value of 0.39 and a minus error rate with a maximum value of −0.42. Therefore, the maximum error rate is 0.42 which is an absolute value of the minus error rate. Referring to FIG. 12, the resolver of Example 5 has a plus error rate with a maximum value of 0.48 and a minus error rate with a maximum value of −0.44. Therefore, the maximum error rate is 0.48.

Figure 13:
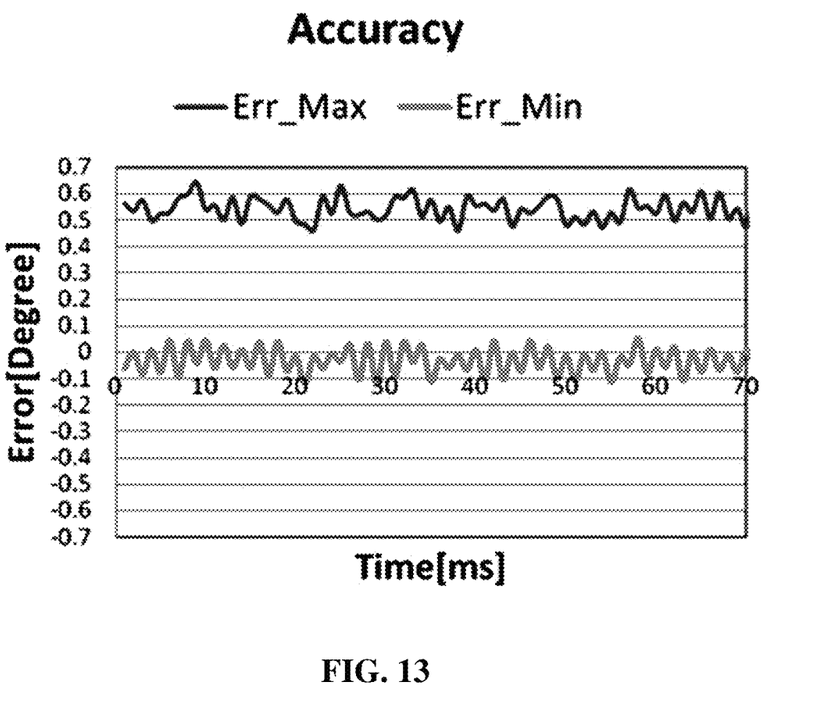
Figure 14:
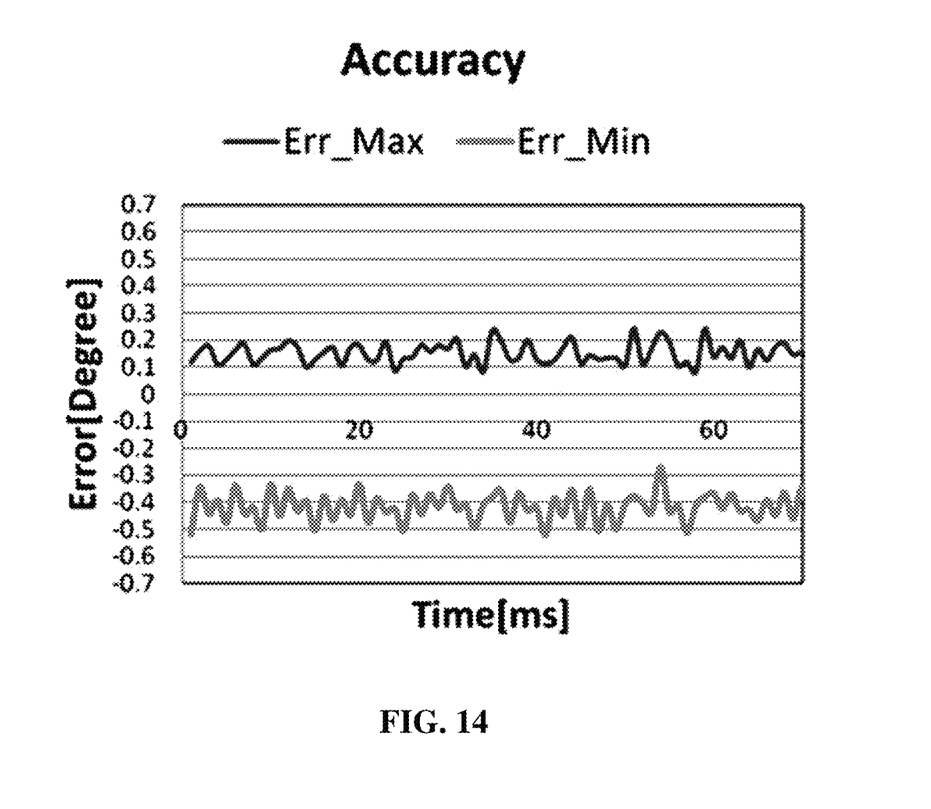
Figure 15:
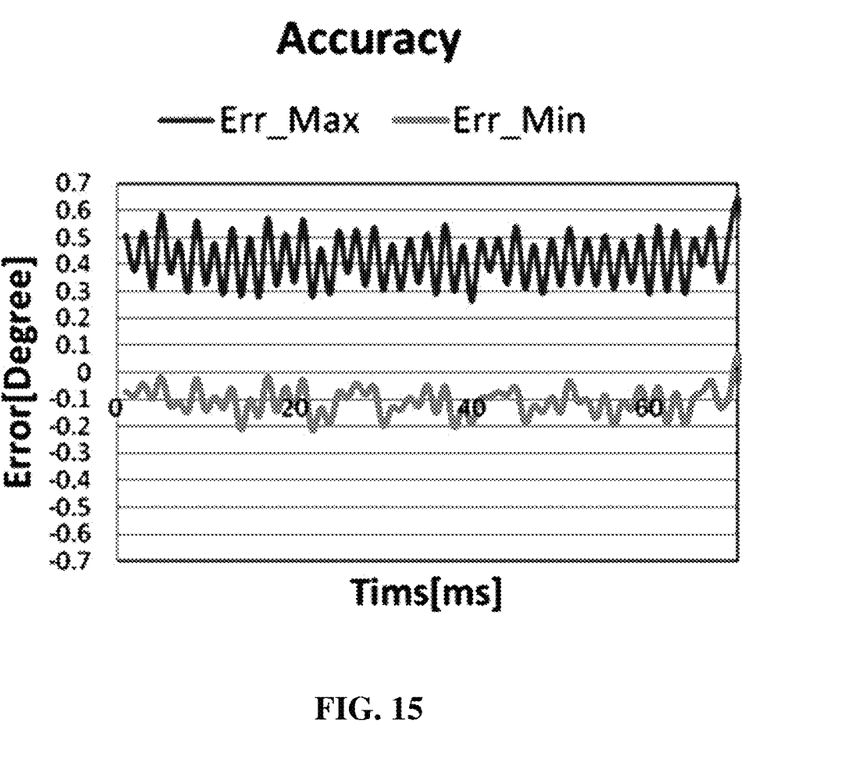
Figure 16:
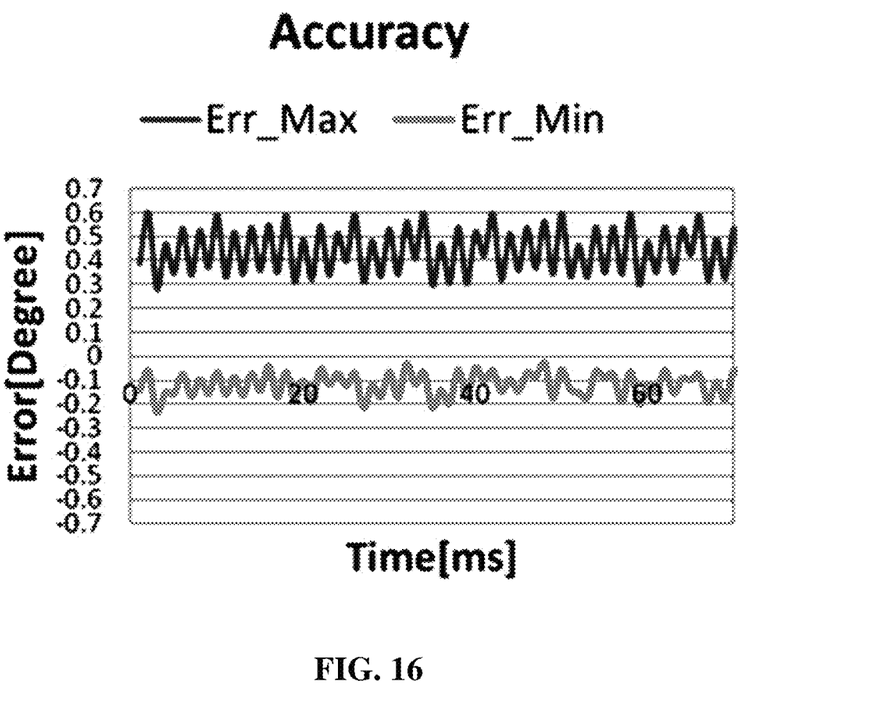

Referring to FIG. 13, the resolver of Comparative Example 1 has a plus error rate with a maximum value of 0.61 and a minus error rate with a maximum value of −0.12. Therefore, the maximum error rate is 0.61. Referring to FIG. 14, the resolver of Comparative Example 2 has a plus error rate with a maximum value of 0.24 and a minus error rate with a maximum value of −0.52. Therefore, the maximum error rate is 0.52 which is an absolute value of the minus error rate. Referring to FIG. 15, the resolver of Comparative Example 3 has a plus error rate with a maximum value of 0.64 and a minus error rate with a maximum value of −0.21. Therefore, the maximum error rate is 0.64. Referring to FIG. 16, the resolver of Comparative Example 4 has a plus error rate with a maximum value of 0.61 and a minus error rate with a maximum value of −0.23. Therefore, the maximum error rate is 0.61.

The above results are listed in Table 1 below.

TABLE 1

|  | occupying ratio | shortest distance | maximum error rate |
| --- | --- | --- | --- |
| Example 1 | 32 | 2.2 | 0.36 |
| Example 2 | 32 | 3.7 | 0.33 |
| Example 3 | 32 | 4.5 | 0.29 |
| Example 4 | 37 | 4.5 | 0.42 |
| Example 5 | 42 | 4.5 | 0.48 |
| Comparative Example 1 | 37 | 2.2 | 0.61 |
| Comparative Example 2 | 37 | 3.7 | 0.52 |
| Comparative Example 3 | 42 | 2.2 | 0.64 |
| Comparative Example 4 | 42 | 3.7 | 0.61 |

In Table 1, in Examples 1 and 2, it may be found that even though a shortest distance between coils in the slot 112 is less than 4 mm, if the coil occupying ratio is 35% or below, the maximum error rate is 0.5 or below, which satisfies product requirements. Meanwhile, in Comparative Examples 1 to 4, it may be found that if a shortest distance between coils in the slot 112 is less than 4 mm and the coil occupying ratio is greater than 35%, the maximum error rate is greater than 0.5, which does not satisfy product requirements.

In particular, if Examples 1 and 2 are compared with Example 3, a maximum error rate when the shortest distance between coils in the slot 112 is 4 mm or above and the coil occupying ratio is 35% or below is lower than a maximum error rate when the shortest distance between coils in the slot 112 is less than 4 mm and the occupying ratio is 35% or below. In other words, it may be found that the best performance is obtained when the shortest distance between coils in the slot 112 is 4 mm or above and the occupying ratio is 35% or below.

In Example 5, it may be found that even though the coil occupying ratio is greater than 35% in the slot 112, if the shortest distance between coils is 4 mm or above, the maximum error rate is 0.48 which is lower than 0.5 and thus satisfies product requirements. Meanwhile, in Comparative Examples 1 to 4, if the coil occupying ratio is greater than 35% in the slot 112 and the shortest distance between coils is less than 4 mm, the maximum error rate is greater than 0.5 and thus does not satisfy product requirements.

In other words, if any one of the condition that the shortest distance between coils in the slot 112 is 4 mm or above and the condition that the coil occupying ratio is 35% or below is satisfied, the resolver has a maximum error rate of 0.5 or below and thus satisfies product requirements. Moreover, if both conditions are satisfied, the maximum error rate is further lower than the case where only one of both conditions is satisfied, thereby ensuring better performance. Meanwhile, if both conditions are not satisfied, the maximum error rate is greater than 0.5 and thus does not satisfy product requirements.

While the present disclosure includes many features, such features should not be construed as limiting the scope of the present disclosure or the claims. Further, features described in respective embodiments of the present disclosure may be implemented in combination in a single embodiment. On the contrary, a variety of features described in a single embodiment of the present disclosure may be implemented in various embodiments, singly or in proper combination.

It should be understood by those skilled in the art that many adaptations, modifications and changes may be made to the present disclosure without departing from the technical aspects of the present disclosure, and the present disclosure described hereinabove is not limited by the disclosed embodiments and the accompanying drawings.

What is claimed is:

1. A resolver, comprising:
   a stator made of a magnetic material and having a plurality of teeth and a plurality of slots alternately formed at an inner side thereof;
   insulation covers respectively having a tooth insulating unit formed at an inner side thereof corresponding to the teeth and mounted to the stator at both upper and lower surfaces of the stator; and
   coils wound on the teeth with the tooth insulating unit being interposed therebetween,
   wherein a coil occupying ratio per slot, which is defined by following equation and represents a ratio of area occupied by the coils in a slot to which the insulation covers are fixed, is 3% to 35%:

$$\text{Coil occupying ratio per slot} = (\text{area occupied by coils in a single slot})/(\text{area of a single slot}) \quad \text{Equation 1.}$$

2. The resolver according to claim 1, wherein the coils include an excitation coil of one phase or more and an output coil of one phase or more.

3. The resolver according to claim 1, further comprising:
   a rotor made of a magnetic material and configured to rotate based on a rotary shaft to change a gap permeance together with the stator.

4. The resolver according to claim 3, wherein the rotor is an inner-type rotor disposed at an inner center of the stator.

5. The resolver according to claim 4, wherein the rotor is ring-shaped having a through hole formed at a center portion thereof so that the rotary shaft is inserted therein and a plurality of salient poles formed at an outer circumference thereof to change the gap permeance.

6. The resolver according to claim 5, wherein the salient pole has an arc shape with a diameter smaller than at least a diameter of the rotor.

7. The resolver according to claim 6, wherein a center of the arc is disposed spaced apart from a center of the rotor by a predetermined distance, and the arcs of the plurality of salient poles have the same diameter.

* * * * *